(12) United States Patent
Kuros et al.

(10) Patent No.: US 10,197,117 B2
(45) Date of Patent: Feb. 5, 2019

(54) TEMPERATURE-BASED CLUTCH PROTECTION FROM CENTRIFUGAL HEAD PRESSURE INHIBITING CLUTCH DISENGAGEMENT

(71) Applicant: CNH Industrial America LLC, New Holland, PA (US)

(72) Inventors: Pawel Kuros, Wood Dale, IL (US); Richard Allen Etheridge, Saint John, IN (US); Brian E. Felsing, Park Ridge, IL (US); Kenneth Scott Hedderman, Chicago, IL (US); Robert C. Prasse, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/166,924

(22) Filed: May 27, 2016

(65) Prior Publication Data
US 2017/0198767 A1    Jul. 13, 2017

Related U.S. Application Data

(60) Provisional application No. 62/277,408, filed on Jan. 11, 2016.

(51) Int. Cl.
*F16D 48/06* (2006.01)
*B60K 17/10* (2006.01)
(Continued)

(52) U.S. Cl.
CPC ............ *F16D 48/066* (2013.01); *B60K 17/10* (2013.01); *F16D 25/0638* (2013.01);
(Continued)

(58) Field of Classification Search
CPC ......... F16D 48/066; F16D 2500/10412; F16D 2500/30404; F16D 2500/3067; F16D 2500/502; F16D 2500/3168
See application file for complete search history.

(56) References Cited

U.S. PATENT DOCUMENTS 4,678,069 A    7/1987   Yoshimura et al.
4,768,635 A    9/1988   Sakurai et al.
(Continued)

FOREIGN PATENT DOCUMENTS

EP    1918602       5/2008
JP    H0242251 A    2/1990
(Continued)

OTHER PUBLICATIONS

Chen, Gang et al.; "Real Time Virtual Temperature Sensor for Transmission Clutches"; SAE International; Apr. 12, 2011; vol. 4, Issue 1.

(Continued)

*Primary Examiner* — Jerrah Edwards
*Assistant Examiner* — Mathew Franklin Gordon
(74) *Attorney, Agent, or Firm* — Rickard K. DeMille; Rebecca L. Henkel

(57) ABSTRACT

A system of a work vehicle includes an engine, a transmission that includes a hydrostatic unit, and a clutch coupled to the transmission. The system also includes a controller communicatively coupled to the engine, the transmission, and the clutch. The controller, in operation, receives a command to disengage the clutch. The controller, in operation, determines an engine speed of the engine. The controller, in operation, also determines a temperature of hydraulic fluid in the clutch. The controller, in operation, further determines a magnitude and time to limit acceleration of the work vehicle based on the engine speed and the
(Continued)

temperature. The controller, in operation, also commands the clutch to disengage. The controller, in operation, further limits the acceleration of the work vehicle using the hydrostatic unit based on the magnitude for the time determined.

10 Claims, 8 Drawing Sheets

(51) Int. Cl.
*F16D 25/0638* (2006.01)
*F16H 61/40* (2010.01)

(52) U.S. Cl.
CPC ............... *B60Y 2200/221* (2013.01); *F16D 2500/10412* (2013.01); *F16D 2500/3067* (2013.01); *F16D 2500/30404* (2013.01); *F16D 2500/502* (2013.01); *F16H 61/40* (2013.01)

(56) References Cited

U.S. PATENT DOCUMENTS

| | | | |
|---|---|---|---|
| 4,838,126 A | 6/1989 | Wilfinger et al. | |
| 5,060,770 A | 10/1991 | Hirano et al. | |
| 5,190,130 A | 3/1993 | Thomas et al. | |
| 5,224,577 A | 7/1993 | Falck et al. | |
| 5,417,626 A | 5/1995 | Gierer | |
| 5,449,329 A | 9/1995 | Brandon et al. | |
| 5,467,854 A | 11/1995 | Creger et al. | |
| 5,493,928 A | 2/1996 | Mitchell et al. | |
| 5,642,283 A | 6/1997 | Schulz et al. | |
| 5,646,842 A | 7/1997 | Schulz et al. | |
| 5,957,807 A | 9/1999 | Takamatsu et al. | |
| 6,223,113 B1 | 4/2001 | McCunn et al. | |
| 7,891,477 B2 * | 2/2011 | Christensen | F16D 25/0638 192/113.35 |
| 8,640,838 B2 | 2/2014 | Nagashima et al. | |
| 8,755,979 B2 | 6/2014 | Ishikawa et al. | |
| 2010/0023227 A1* | 1/2010 | Storer | E02F 3/6481 701/48 |
| 2012/0158264 A1 | 6/2012 | Kuras et al. | |

FOREIGN PATENT DOCUMENTS

| | | |
|---|---|---|
| JP | H0242252 A | 2/1990 |
| JP | 2009168059 | 7/2009 |
| JP | 2015045382 | 3/2015 |
| WO | 2014155195 A1 | 10/2014 |

OTHER PUBLICATIONS

European Search Report for European Application No. 17150901.1 dated Jun. 12, 2017 (5 pages).

* cited by examiner

TEMPERATURE-BASED CLUTCH PROTECTION FROM CENTRIFUGAL HEAD PRESSURE INHIBITING CLUTCH DISENGAGEMENT

CROSS REFERENCE TO RELATED APPLICATION

This application is claims priority to and benefit from U.S. Provisional Application No. 62/277,408 to Prasse et al. filed Jan. 11, 2016, and incorporates the entirety of the same by reference herein.

BACKGROUND

The present disclosure relates generally to improving clutch disengagement of a vehicle. In particular, the present disclosure relates to improving clutch disengagement of the vehicle by enabling a clutch piston time to retract.

In power shift transmissions, a centrifugal head may build up in clutches rotating at high speed when they are not engaged. The centrifugal head may generate enough pressure to cause a disengaged clutch to lock up, resulting in two opposing clutches to fight one another. This may lead to reducing functionality in one of the clutches. One way to stop the centrifugal head from building up is to add a port to a tank in the clutch piston. The port may enable the centrifugal head to flow to the tank, thus not building enough pressure to engage the clutch when the clutch is commanded off. When the clutch is commanded on, the piston moving full stroke closes the port. The port is called Centrifugal Head Internal Relief Port, CHIRP. While the port will prevent clutches from engaging at high rotational speeds, it will not allow them to release at high rotational speeds. When a transmission with power shift clutches is shifted, an offgoing clutch is commanded off near the rotational speed at which it self-engages due to the centrifugal head, and the clutch is connected to the output of the transmission, the next higher gear engaging may rapidly accelerate the vehicle. This rapid acceleration may cause the offgoing clutch piston to not retract fast enough to enable the CHIRP valve to open. This condition becomes more prevalent when the transmission oil is cold, and increases the time for the piston to retract. Power shift transmissions that may be used in conjunction with Continuously Variable Transmissions may perform power shifts at a synchronous speed.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a system of a work vehicle includes an engine, a transmission that includes a hydrostatic unit, and a clutch coupled to the transmission. The system also includes a controller communicatively coupled to the engine, the transmission, and the clutch. The controller, in operation, receives a command to disengage the clutch. The controller, in operation, determines an engine speed of the engine. The controller, in operation, also determines a temperature of hydraulic fluid in the clutch. The controller, in operation, further determines a magnitude and time to limit acceleration of the work vehicle based on the engine speed and the temperature. The controller, in operation, also commands the clutch to disengage. The controller, in operation, further limits the acceleration of the work vehicle using the hydrostatic unit based on the magnitude for the time determined.

In a second embodiment, a tangible, non-transitory, machine-readable-medium includes machine-readable instructions to receive a command to disengage a clutch of a work vehicle. The tangible, non-transitory, machine-readable-medium also includes machine-readable instructions to determine an engine speed of the work vehicle. The tangible, non-transitory, machine-readable-medium also includes machine-readable instructions to determine a temperature of hydraulic fluid in the clutch. The tangible, non-transitory, machine-readable-medium further includes machine-readable instructions to determine a magnitude and time to limit acceleration of the work vehicle based on the engine speed and the temperature. The tangible, non-transitory, machine-readable-medium also includes machine-readable instructions to command the clutch to disengage. The tangible, non-transitory, machine-readable-medium further includes machine-readable instructions to limit the acceleration of the work vehicle based on the magnitude for the time determined.

In a third embodiment, a method for protecting a clutch of a work vehicle from centrifugal head pressure inhibiting clutch disengagement includes receiving a command to disengage the clutch. The method also includes determining an engine speed of the work vehicle. The method further includes determining a temperature of hydraulic fluid in the clutch. The method also includes determining a magnitude and time to limit acceleration of the work vehicle based on the engine speed and the temperature. The method further includes commanding the clutch to disengage. The method also includes limiting the acceleration of the work vehicle based on the magnitude for the time determined.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
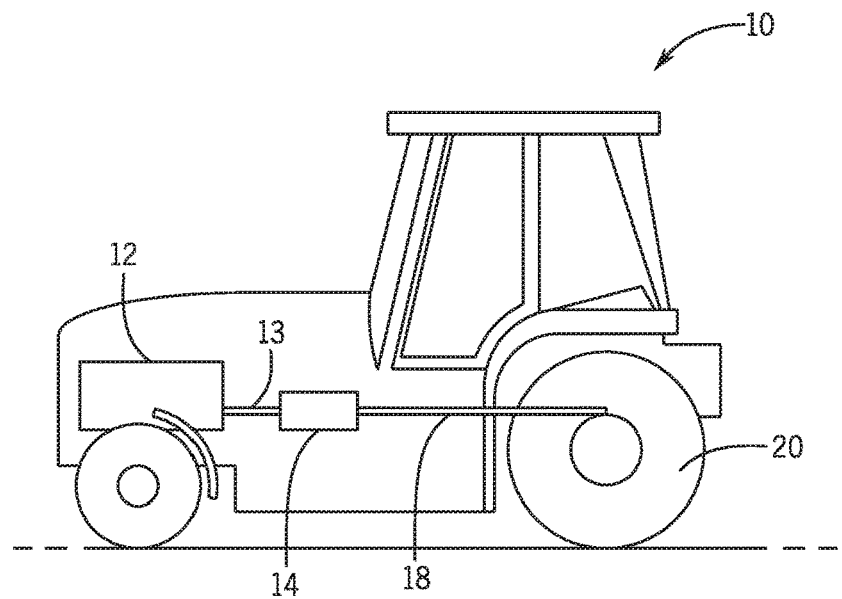
FIG. 1 is a diagram of a tractor in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to improving clutch disengagement of a vehicle. In particular, the present disclosure relates to improving clutch disengagement of the vehicle by enabling a clutch piston time to retract. A power shift transmission may use a hydrostatic unit to control a speed of a tractor between shifts. The hydrostatic unit may be used to limit transmission output acceleration at low temperatures, thus enabling the offgoing clutch piston to retract on upshifts and allowing the CHIRP to open such that the clutch disengages. Limiting acceleration of the tractor during a shift where the offgoing clutch has CHIRP may reduce the possibility of the next higher gear spinning a clutch housing at a rotational speed above the centrifugal self-engagement speed during cold temperatures. This limiting of tractor acceleration may enable the clutch piston time retract, thus opening up the CHIRP. Accordingly, systems and methods are disclosed in which acceleration of the vehicle is limited such that the clutch piston has time to retract. In particular, one embodiment of the present disclosure includes a system of a work vehicle that includes an engine, a transmission that includes a hydrostatic unit, and a clutch coupled to the transmission. The system also includes a controller communicatively coupled to the engine, the transmission, and the clutch. The controller, in operation, receives a command to disengage the clutch. The controller, in operation, determines an engine speed of the engine. The controller, in operation, also determines a temperature of hydraulic fluid in the clutch. The controller, in operation, further determines a magnitude and time to limit acceleration of the work vehicle based on the engine speed and the temperature. The controller, in operation, also limits the acceleration of the work vehicle using the hydrostatic unit based on the magnitude for the time determined. The controller, in operation, further commands the clutch to disengage.

FIG. 1 is a diagram of a vehicle (e.g., a work vehicle such as a tractor 10), including an engine 12, an input shaft 13, a transmission 14 (e.g., a power shift transmission), and a drive shaft 18, in accordance with an embodiment of the present disclosure. The transmission 14 is coupled to the engine 12 via the input shaft 13 to transfer power from the engine 12 to the drive shaft 18, which powers wheels 20 of the tractor 10.

Figure 2:
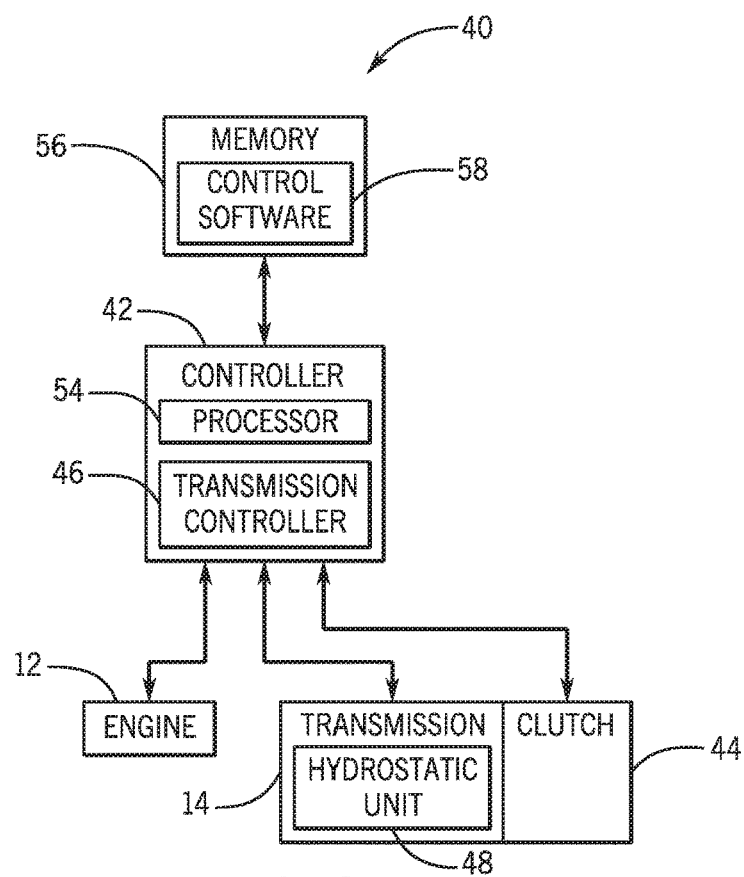
FIG. 2 is a block diagram of a control system that may be employed with the tractor of FIG. 1, in accordance with an embodiment of the present disclosure.

FIG. 2 is a block diagram of a control system 40 that may be employed within the tractor 10 of FIG. 1, in accordance with an embodiment of the present disclosure. The control system 40 includes a controller 42 that may output and receive signals to control the components of the tractor 10. For example, the controller may be communicatively coupled to the engine 12, the transmission 14, and a clutch 44 of the tractor 10. The controller 42 may include a transmission controller 46 that controls the transmission 14 by instructing changes in gear ratios of the transmission 14 and/or controls the speed and/or acceleration of the tractor 10 between gear shifts. In some embodiments, the transmission controller 46 is not a separate component of the controller 42, and instead is integrated with the controller 42. The transmission 14 may include a hydrostatic unit 48 that may control the speed and/or acceleration of the tractor 10 between gear shifts. The controller 42 may also control the engine 12 (e.g., by adjusting a throttle of the engine 12) to establish a desired speed of the engine 12.

The controller 42 includes a processor 54 (e.g., a microprocessor) that may execute software, such as software for controlling the tractor 10. Moreover, the processor 54 may include multiple microprocessors, one or more "general-purpose" microprocessors, one or more special-purpose microprocessors, and/or one or more application specific integrated circuits (ASICS), or some combination thereof. For example, the processor 54 may include one or more reduced instruction set (RISC) processors. The controller 42 may be coupled to a memory device 56 that may store information such as control software 58, look up tables, configuration data, etc. In some embodiments, the memory device 56 may be internal to the controller 42. The memory device 56 may include a tangible, non-transitory, machine-readable-medium, such as a volatile memory (e.g., a random access memory (RAM)) and/or a nonvolatile memory (e.g., a read-only memory (ROM)). The memory device 56 may store a variety of information and may be used for various purposes. For example, the memory device 56 may store machine-readable and/or processor-executable instructions (e.g., firmware or software) for the processor 54 to execute, such as instructions for controlling the tractor 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data. In some embodiments, the memory device 56 may store the controller 42 and/or the transmission controller 46 as part of the control software 58. The control software 58 may then be executed by the processor 54 to controls the transmission 14 by instructing changes in gear ratios of the transmission 14 and/or acceleration of the tractor 10.

In power shift transmissions, a clutch 44 rotating at high speed may build up centrifugal head pressure. The buildup of centrifugal head pressure may cause a disengaged clutch to lock up, resulting in two opposing clutches to work against each other. This may lead to reducing functionality in at least one of the clutches. A centrifugal head internal relief port of a component (e.g., a housing or a piston) of the clutch 44 may enable the centrifugal head pressure to flow to a tank of the tractor 10, thus reducing the centrifugal head pressure and reducing the chance of the clutch engaging, even though the clutch 44 may be commanded off.

Figure 3:
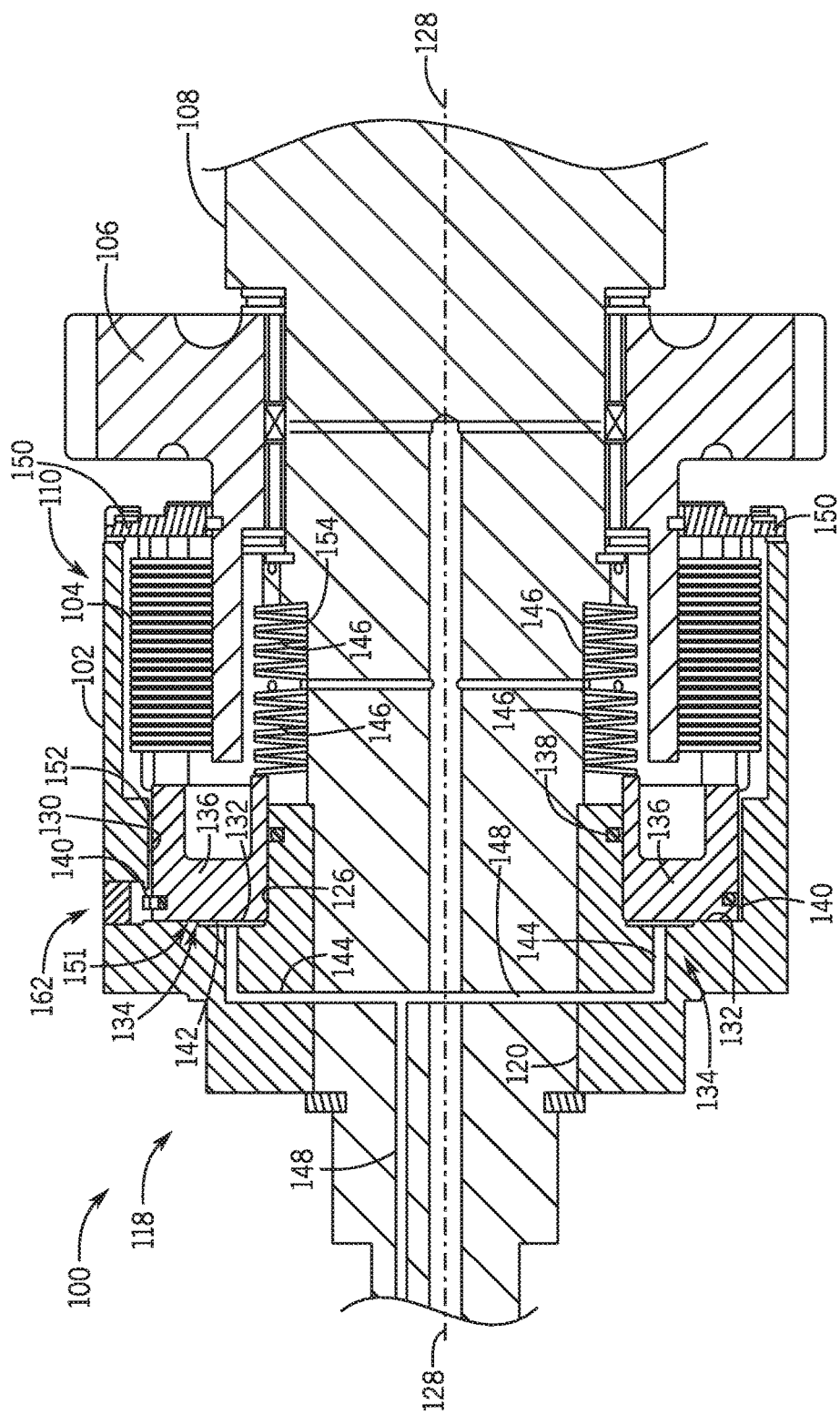
FIG. 3 is a diagram of a clutch assembly that may be employed within the tractor of FIG. 1, in accordance with an embodiment of the present disclosure.

FIG. 3 is a diagram of a clutch assembly 100 that includes the clutch 44 and may be employed within the tractor 10 of FIG. 1, in accordance with an embodiment of the present disclosure. The clutch assembly includes a clutch carrier 102, a clutch plate stack 104 that includes a plurality of interdigitated clutch plates, a gear 106, and a shaft 108 on which the clutch assembly 100 is supported. The gear 106 is supported on shaft 108 and may freely rotate via an arrangement of bearings. The clutch carrier 102 is an elongated cylindrical body having a thin cylindrical portion 110. The clutch carrier 102 also includes a coupling or shaft mount 118 that is fixed to transmission shaft 108, and is formed integral with and supports the thin cylindrical portion 110. The shaft mount 118 includes a central aperture 120 having inwardly facing splines that receive and engage corresponding mating splines on the outer surface of the transmission shaft 108. The splines ensure that the clutch carrier 102 rotates with the transmission shaft 108.

The shaft mount 118 of the clutch carrier 102 includes a hydraulic chamber or cylinder 134 having an inner cylindrical wall 126 that is coaxial with a longitudinal axis 128 and outer cylindrical wall 130 that is also coaxial with the longitudinal axis 128. The walls 126 and 130 are disposed in a parallel relationship and receive a piston 136 of the clutch 44. The cylinder 134 also has an end surface 132 that is arranged substantially orthogonal to longitudinal axis 128 of the clutch carrier 102 and the shaft 108. The walls 126, 130 and end surface 132 define the substantially circular hydraulic cylinder 134 that supports the substantially circular piston 136. The piston 136 is supported in the cylinder 134 by two sealing rings 138 and 140. The sealing ring 138 is substantially circular that is disposed in a substantially circular groove in the inner wall 126. The sealing ring 140 is disposed in a substantially circular groove in an outer wall of the piston 136. These two sealing rings 138, 140 reduces the likelihood that hydraulic fluid that acts on surface 142 of piston 136 from leaking out around the sidewalls of the piston 136.

The clutch carrier 102 has internal hydraulic fluid passages 144 that extend from the end surface 132 to the inner wall of aperture 120. The passages 144 conduct the hydraulic fluid to and from a first portion 151 of the cylinder 134. The first portion 151 of the cylinder 134 includes a variable volume that expands when fluid pressure is sufficient to urge the piston 136 in a direction toward the clutch plate stack 104 in order to engage the clutch 44 and provide rotation to the clutch carrier 102 and the shaft 108. The first portion 151 of the cylinder 134 includes the volume formed by the sealing ring 138 and sealing ring 140 receiving fluid pressure via passage 144. A second portion 152 of the cylinder 134 includes a volume on the opposite side of the first portion 151 formed by the sealing rings 138, 140 sharing the hydraulic fluid with the clutch components, such as clutch plate stack 104. When the hydraulic fluid is introduced into passages 144, it forces the piston 136 away from the end surface 132 of the circular cylinder 134 (to the right as shown in FIG. 3) toward the clutch plate stack 104, wherein the volume of the first portion 151 is increased and the volume of the second portion 152 is decreased. When the hydraulic fluid is removed from the passages 144 and from the first portion 151, piston 136 is urged by Belleville washers 146 toward the end surface 132 and away from the clutch plate stack 104.

In use, hydraulic valves connected to the transmission 14 apply the hydraulic fluid under pressure into passages 148, where the hydraulic fluid is conducted up the passages 148 and into the passages 144 in the clutch carrier 102. The hydraulic fluid then forces the piston 136 toward the clutch plate stack 104, compressing the clutch plate stack 104 against clutch backing plate 150. This compression forces the clutch plates of the clutch plate stack 104 together and engages the clutch 44.

The clutch assembly 100 also includes the Belleville washers 146. The washers 146 are arranged in an alternating stack with abutting inside edges 154. In this configuration, the stack of washers 146 acts as a spring, pushing against the circular piston 136, and forces the piston 136 in a direction toward end surface 132. The force provided by the washers 146 urges the piston 136 away from the clutch plate stack 104 giving the clutch plates room to move with respect to each other without binding. Thus, when sufficient hydraulic fluid is released from passages 148, the force provided by the washers 146 may overcome the fluid pressure in the passages 144, urging the piston 136 away from the clutch plate stack 104, thereby disengaging the clutch assembly 100.

When the piston 136 applies pressure to the clutch plate stack 104, the piston 136 forces both sets of interleaved clutch plates together, causing the clutch plates to rotate together. Because the one set of clutch plates of the clutch plate stack 104 is engaged by splines to the gear 106, and another set of clutch plates of clutch plate stack 104 is engaged by ears or protrusions to clutch carrier 102, and since the clutch carrier 102 is fixed to shaft 108, the gear 106 rotates with the shaft 108 when the clutch 44 is engaged. When the piston 136 is forced against the clutch plate stack 104, it causes the clutch plate stack 104 to lock together and rotate as one single structure, causing the gear 106 to rotate together with the shaft 108 as though the gear 106 was fixed rigidly on the shaft 108.

Figure 4:
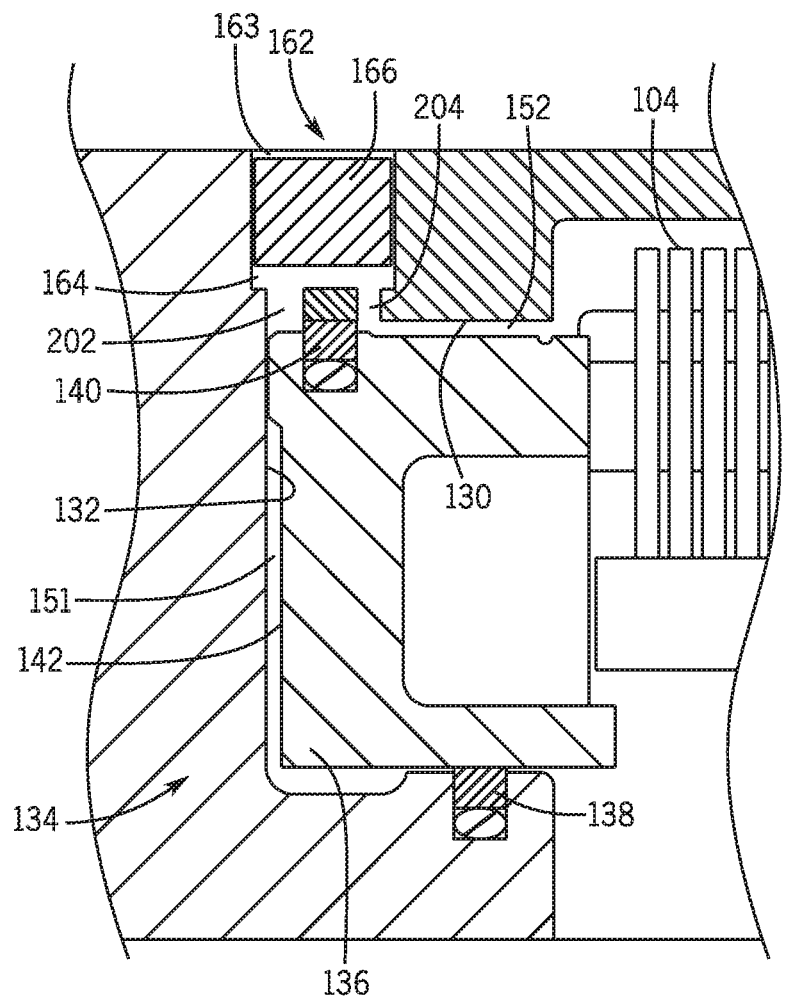
FIG. 4 is a diagram of an expanded view of a bleed assembly and clutch components in FIG. 3 with a clutch piston in a disengaged position, in accordance with an embodiment of the present disclosure.
Figure 5:
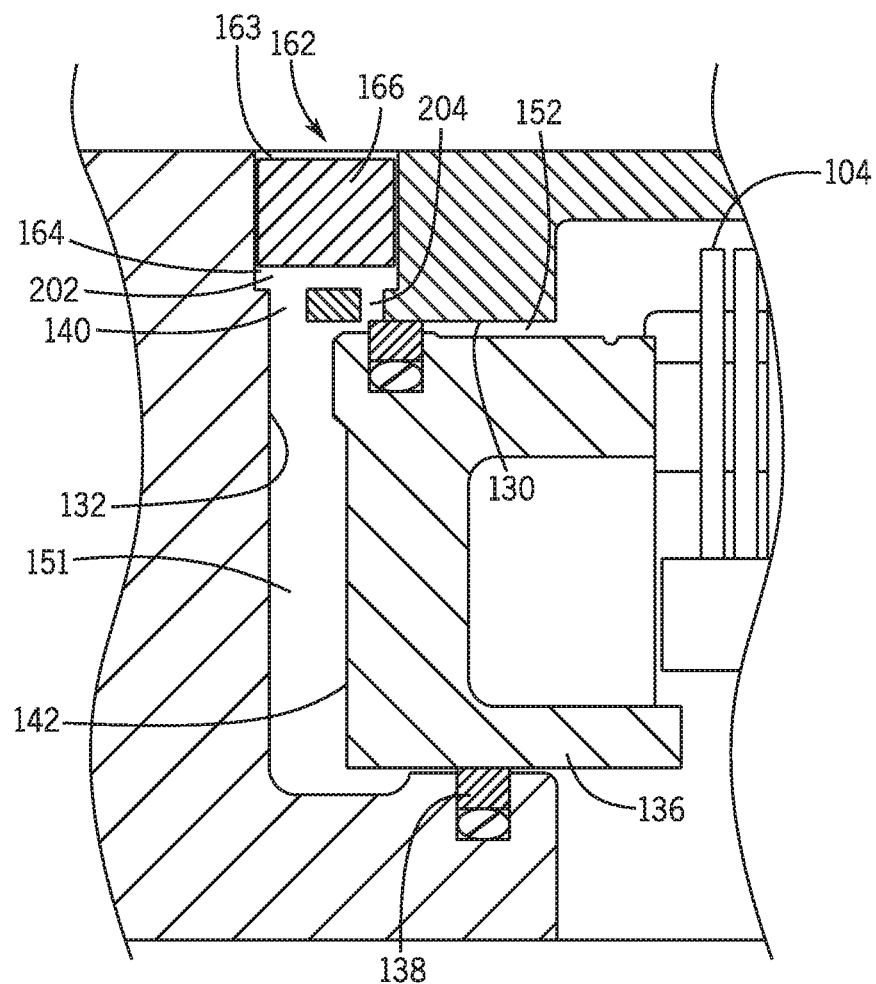
FIG. 5 is a diagram of an expanded view of a bleed assembly and clutch components in FIG. 3 with a clutch piston in an engaged position, in accordance with an embodiment of the present disclosure.

As shown in FIGS. 3 and 4, a bleed assembly 162 is arranged and disposed adjacent the cylinder 134. Although a single bleed assembly 162 is shown, a plurality of bleed assemblies 162 may be arranged along the circumference of the clutch carrier 102. The bleed assembly 162 in FIGS. 3 and 4 includes a bleed chamber 164 through which hydraulic fluid may pass when the surface 142 of the piston 136 is positioned substantially adjacent to the end surface 132. The bleed chamber 164 includes a sealing plug 166 positioned to seal the chamber from fluid leakage from the cylinder 134. The sealing plug 166 may include any known sealing device suitable for sealing opening 163 from fluid leakage. In some embodiments, an opening or bore 163 may be machined in the clutch carrier 102. Bleed or centrifugal head internal relief ports 202 and 204 are then machined in the opening 163 such that the hydraulic fluid may flow to the cylinder 134. A sealing plug 166 is thereafter inserted into the opening 163 to form the bleed chamber 164. Although FIGS. 3-5 show the presence of the sealing plug 166, the bleed chamber 164 may be formed using any suitable method for forming a chamber that is capable of enabling the hydraulic fluid to flow to the cylinder 134. For example, the clutch carrier 102 may be cast or formed with a bleed chamber 164 and bleed ports 202 and 204, such that the clutch carrier 102 does not include the opening 163.

FIG. 4 is a diagram of an expanded view of the bleed assembly 162 and clutch components in FIG. 3, including the clutch plate stack 104 and the clutch backing plate 150, in accordance with an embodiment of the present disclosure. The piston 136 as shown in FIG. 4 is in a disengaged position. The surface 142 of the piston 136 is substantially adjacent to the end surface 132. The first portion 151 of the cylinder 134 includes the volume of the cylinder 134 in front of the sealing ring 140 and the sealing ring 138 forming a chamber that provides fluid pressure to actuate the piston 136 (i.e., left side of the sealing ring 140 and the sealing ring 138, as shown in FIG. 4). The second portion 152 of the cylinder 134 includes the volume of the cylinder 134 behind the sealing ring 140 and the sealing ring 138 (i.e., right side of the sealing ring 140 and the sealing ring 138, as shown in FIG. 4). The first portion 151 includes a volume into which pressurized fluid is provided to actuate the piston 136 into an engaged position (see, e.g., FIG. 5). As the disengaged clutch carrier 102 rotates and fluid pressure within the first portion 151 increases due to centrifugal forces, the hydraulic fluid may be urged outward toward outer wall 130, particularly during times of excessive rotation, such as during downhill travel of the vehicle, the hydraulic fluid enters the bleed chamber 164 via the inlet bleed or inlet centrifugal head internal relief port 202 and exits to the second portion 152 via the exhaust or centrifugal head internal relief port 204, bypassing the sealing ring 140. Since the hydraulic fluid is bypassed, there may be little to no corresponding pressure to urge the piston 136 toward the clutch plate stack 104, reducing the likelihood of unintentional clutch application.

FIG. 5 shows the arrangement of FIG. 4, wherein the piston 136 has been urged into the engaged position by fluid pressure in the first portion 151. The fluid pressure provided to the first portion 151 to engage the clutch 44 is provided from a clutch valve and is a higher pressure than a pressure present in the first portion 151 at times of excessive rotational speed. The pressure to actuate the piston 136 into the engaged position is sufficient to urge the piston 136 from the position shown in FIG. 4 to a position wherein the sealing ring 140 is in contact with the outer wall 130, wherein a substantially fluid tight seal is present. Therefore, the hydraulic fluid may be blocked from bypassing the sealing ring 140 from the first portion 151 to the second portion 152. Hydraulic fluid entering the bleed chamber 164 from the first portion 151 may only return to the first portion 151. That is, any hydraulic fluid circulating between bleed inlet port 202, bleed exhaust port 204, and bleed chamber 164, remains in the first portion 151. The flow of hydraulic fluid may cease when the pressures between the bleed chamber 164, inlet port 202, and the bleed exhaust port 204 equalize.

Figure 6:
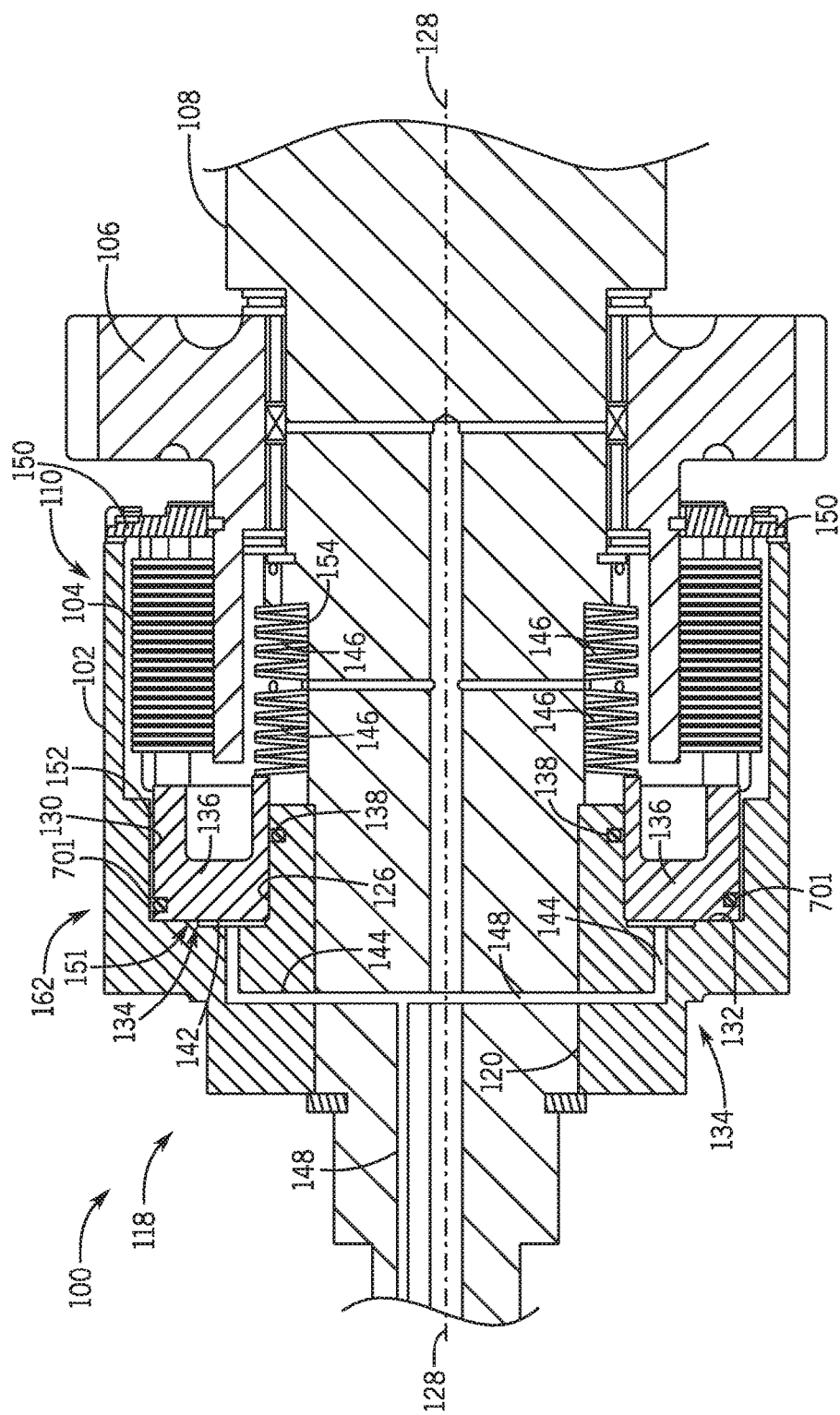
FIG. 6 is a diagram of a clutch assembly that may be employed within the tractor of FIG. 1, in accordance with an embodiment of the present disclosure.

FIG. 6 is a diagram of a clutch assembly 100 that includes the clutch 44 and may be employed within the tractor 10 of FIG. 1, in accordance with an embodiment of the present disclosure. The clutch assembly 100 in FIG. 6 includes a bleed assembly 162 selectively sealing bleed ring 701. The cylinder 134 includes a recess 703 (see, e.g., FIG. 7) that contacts a surface of the bleed ring 701 and permit a sliding contact such that the diameter of the bleed ring 701 is varied between a maximum diameter in the recess 703 to a minimum diameter adjacent to the outer wall 130.

Figure 7:
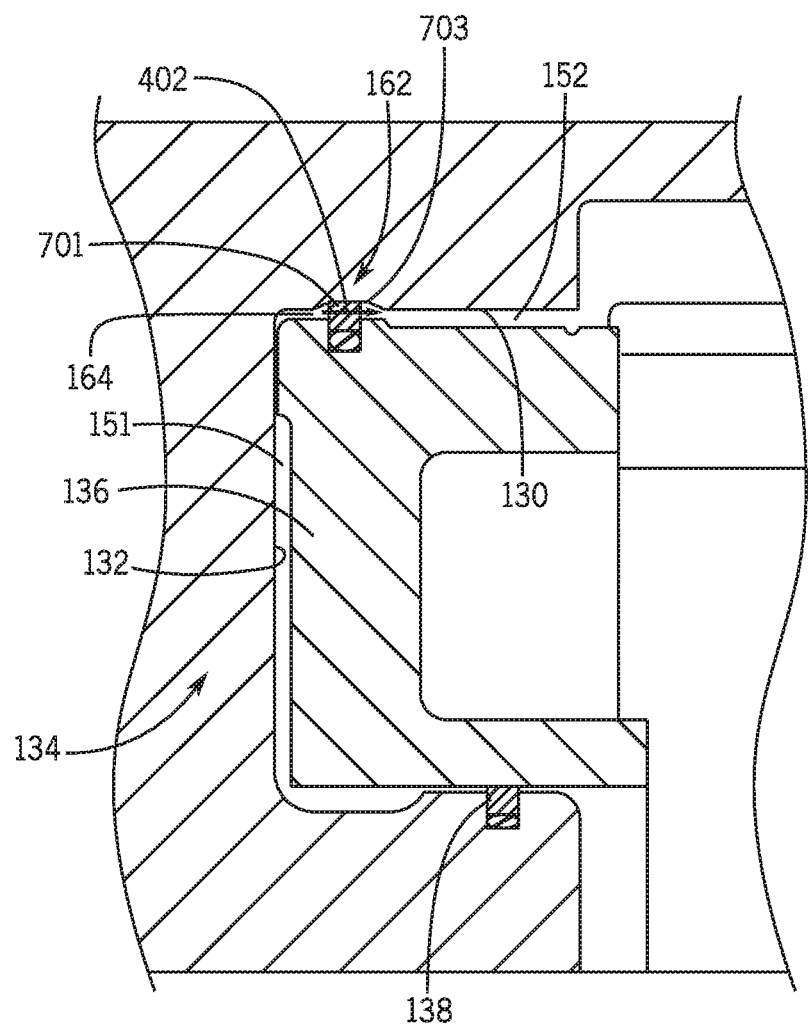
FIG. 7 is a diagram of an expanded view of a bleed assembly and clutch components in FIG. 6 with a clutch piston in a disengaged position, in accordance with an embodiment of the present disclosure.

FIG. 7 shows an enlarged view of the bleed assembly 162 of FIG. 6 with the piston 136 in the disengaged position and the flow 402 of the hydraulic fluid forms the centrifugal head pressure, in accordance with an embodiment of the present disclosure. During normal operation, the piston 136 is urged against the end surface 132 by a spring, such as Belleville washers 146, or other force-producing device wherein the contact between the piston 136 and the end surface 132 is such that the hydraulic fluid is substantially blocked from escaping through the bleed chamber 164. As the rotational speed of the clutch carrier 102 increases, such as during downhill acceleration, the centrifugal head in the first portion 151 of the cylinder 134 increases sufficiently to urge the piston 136 in a direction toward clutch plate stack 104 (as illustrated in FIG. 6). As the piston 136 begins to move, a leak path is opened from first portion 151, through bleed ring 701 to second portion 152 around the piston 136 to reduce the pressure behind the piston 136. The leakage through bleed ring 701 may block the piston 136 from advancing to the clutch plate stack 104 to engage the clutch 44. When the centrifugal head pressure is dissipated, the spring force of the Belleville washers 146 or other spring device will urge the piston 136 back toward the end surface 132 wherein contact with the end surface 132 substantially blocks the hydraulic fluid from escaping through the bleed chamber 164. The positioning of the bleed assembly 162, specifically the bleed ring 701, is along the periphery of the cylinder 134, which may permit the pressure to be exhausted at or near a point wherein the pressure, due to centrifugal forces, is at or near a maximum value. This positioning allows the bleed assembly 162 to relieve substantially all of the centrifugal head pressure.

Figure 8:
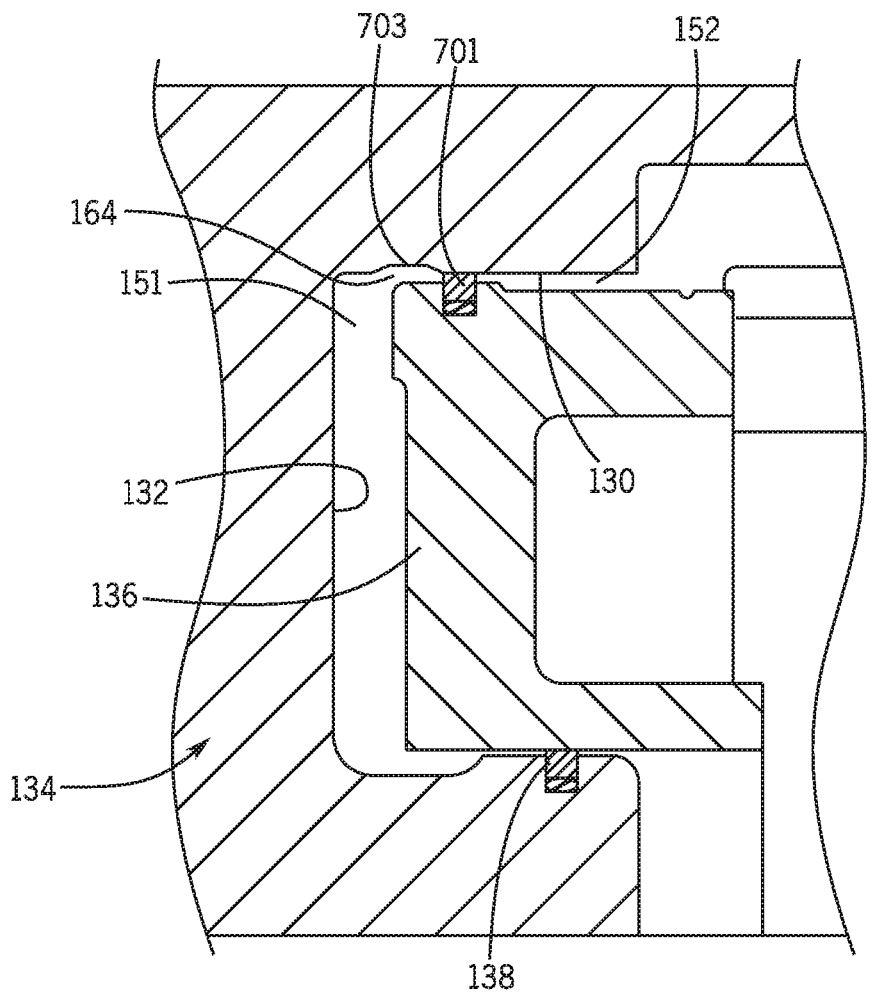
FIG. 8 is a diagram of an expanded view of a bleed assembly and clutch components in FIG. 6 with a clutch piston in an engaged position, in accordance with an embodiment of the present disclosure.

FIG. 8 shows an enlarged view of the bleed assembly 162 of FIG. 6 with the piston 136 is in the engaged position and the flow of the hydraulic fluid is substantially blocked, in accordance with an embodiment of the present disclosure. In the engaged position, the fluid pressure in the first portion 151 maintains the piston 136 position and the bleed ring 701 has a reduced diameter corresponding to a configuration that substantially stops leakage of the hydraulic fluid. That is, the bleed ring 701 has slid sufficiently along the cylinder 134 so that the ring 701 is no longer in contact with the recess 703 and is in contact with the minimum diameter adjacent to the wall 130.

As described above, when the clutch 44 is engaged, the clutch piston 136 moving full stroke closes the centrifugal head internal relief ports 202, 204. However, while the ports 202, 204 may reduce the likelihood of the clutch 44 from engaging at high rotational speeds, the ports 202, 204 may not allow them to release at the high rotational speeds. When shifting a transmission with a power shift clutch, the transmission controller 46 commands an offgoing (and engaged) clutch off near the rotational speed at which the clutch would self-engage because of the centrifugal head pressure. In particular, when upshifting, engaging an immediately higher gear may rapidly accelerate the tractor 10. The rapid acceleration may cause the offgoing clutch piston to not disengage quickly enough to enable the ports 202, 204 to open. This condition is prevalent when the hydraulic fluid is at a lower temperature, increasing viscosity of the hydraulic, resulting in increasing the time for the piston 136 to disengage.

Power shift transmissions that may be used in conjunction with Continuously Variable Transmissions may perform power shifts at a synchronous speed. The power shift transmission 14 may use the hydrostatic unit 48 to control the speed and/or acceleration of the tractor 10 between gear shifts. The hydrostatic unit 48 may limit output acceleration of the tractor 10 at lower temperatures, reducing the possibility of the next higher gear of the transmission 14 during an upshift to rotate a clutch 44 at a rotational speed above the centrifugal self-engagement speed. As a result, a sufficient time may be provided for the centrifugal head internal relief ports 202, 204 to open and the offgoing clutch piston to disengage.

Figure 9:
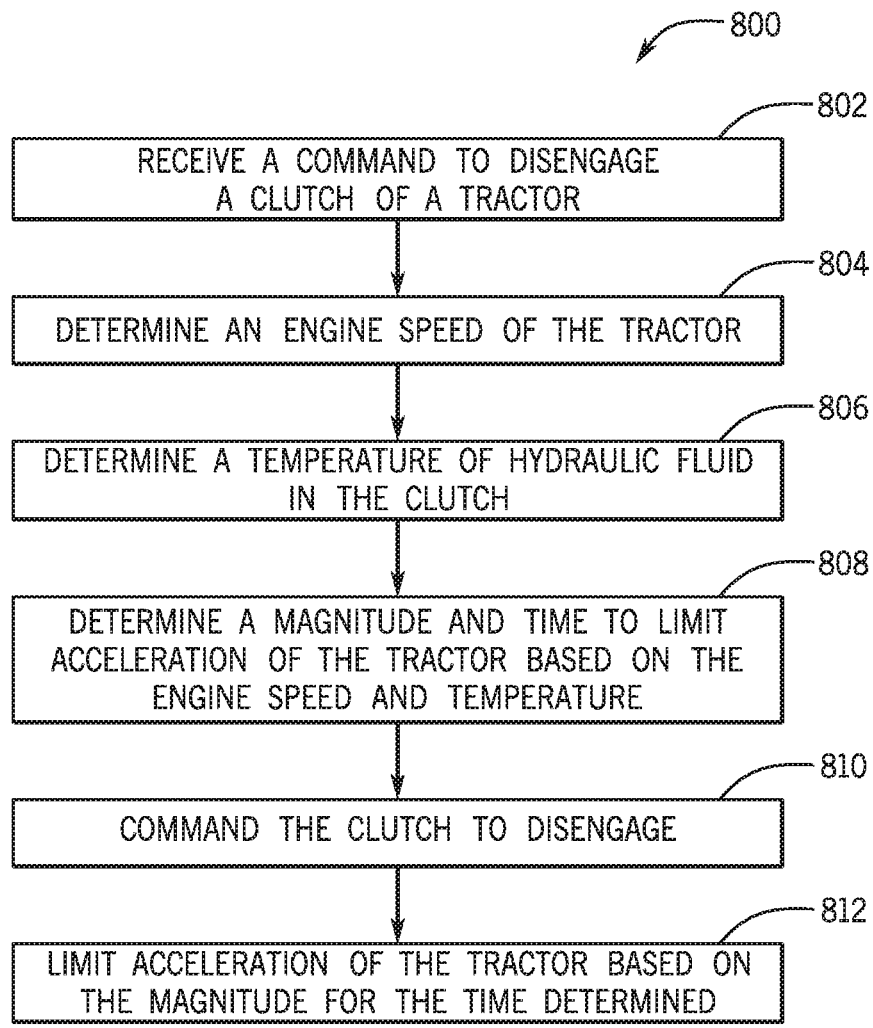
FIG. 9 is a flow diagram of a method for protecting the clutch from centrifugal head pressure inhibiting clutch disengagement, in accordance with an embodiment of the present disclosure.

FIG. 9 is a flow diagram of a method 800 for protecting the clutch 44 from centrifugal head pressure inhibiting clutch disengagement, in accordance with an embodiment of the present disclosure. The controller 42 receives (block 802) a command to disengage the clutch 44 of the tractor 10 (e.g., from an operator of the tractor 10). The controller 42 determines (block 804) an engine speed of the engine 12 of the tractor 10. In some embodiments, the controller 42 is communicatively coupled to a sensor that is in turn communicatively coupled to the engine 12. The sensor may determine the engine speed and send a signal that includes information related to the engine speed to the controller 42. The controller 42 also determines (block 806) a temperature of the hydraulic fluid in the clutch 44. In some embodiments, the controller 42 is communicatively coupled to a sensor that is in turn communicatively coupled to the clutch 44. The sensor may determine the temperature of the hydraulic fluid in the clutch 44 and send a signal that includes information related to the temperature to the controller 42.

The controller 42 determines (block 808) a magnitude and time to limit acceleration of the tractor 10 based on the engine speed and the temperature of the hydraulic fluid. In some embodiments, if the temperature of the hydraulic fluid is not less than a temperature threshold, then the magnitude and the time to limit acceleration of the tractor 10 may both be zero. In some embodiments, the controller 42 may use the processor 54, the memory device 56, and/or the control software 58 to determine the magnitude and time to limit acceleration. For example, the processor 54 may use a computer program in the control software 58 that may access lookup tables in the memory device 56 to determine the magnitude and time to limit acceleration based on the engine speed and temperature of the hydraulic fluid.

The controller 42 commands (block 810) the clutch 44 to disengage. The controller 42 then limits (block 812) acceleration of the tractor 10 based on the magnitude for the time determined in block 808. In some embodiments, the transmission controller 46 sends a command to the hydrostatic unit 48 of the transmission 14 to limit output acceleration of the tractor 10. By limiting output acceleration of the tractor 10 at lower temperatures, the possibility of the next higher gear of the transmission 14 rotating a clutch 44 at a rotational speed above the centrifugal self-engagement speed during an upshift may be reduced. As a result, more time is provided for the centrifugal head internal relief ports 202, 204 to open and the offgoing clutch piston to disengage.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system of a work vehicle, comprising:
an engine;
a transmission, comprising a hydrostatic unit configured to control a speed of the work vehicle;
a clutch coupled to the transmission, wherein the clutch comprises a centrifugal head internal relief port;
a controller communicatively coupled to the engine, the transmission, and the clutch, wherein the controller, in operation:
receives a command to disengage the clutch;
determines an engine speed of the engine;
determines a temperature of hydraulic fluid in the clutch;
determines a magnitude for a time to limit acceleration of the work vehicle based on the engine speed and the temperature, wherein limiting the acceleration of the work vehicle at the magnitude for the time causes the clutch to rotate at a rotational speed less than a centrifugal self-engagement speed;
commands the clutch to disengage; and
limits the acceleration of the work vehicle using the hydrostatic unit based on the magnitude for the time determined, wherein limiting the acceleration of the work vehicle at the magnitude for the time causes the clutch to rotate at the rotational speed less than the centrifugal self-engagement speed, wherein rotating the clutch at the rotational speed less than the centrifugal self-engagement speed enables the centrifugal head internal relief port to open and the clutch to disengage.

2. The system of claim 1, wherein determining the engine speed of the engine comprises receiving a signal from a sensor coupled to the engine, wherein the signal comprises information related to the engine speed.

3. The system of claim 1, wherein determining the temperature of the hydraulic fluid in the clutch comprises receiving a signal from a sensor coupled to the clutch, wherein the signal comprises information related to the temperature of the hydraulic fluid.

4. The system of claim 1, wherein the magnitude for the time to limit the acceleration of the work vehicle are zero when the temperature of the hydraulic fluid is not less than a temperature threshold.

5. A tangible, non-transitory, machine-readable-medium, comprising machine-readable instructions to cause a processor to:
receive a command to disengage a clutch of a work vehicle, wherein the clutch comprises a centrifugal head internal relief port;
determine an engine speed of the work vehicle;
determine a temperature of hydraulic fluid in the clutch;
determine a magnitude for a time to limit acceleration of the work vehicle based on the engine speed and the temperature, wherein limiting the acceleration of the work vehicle at the magnitude for the time causes the clutch to rotate at a rotational speed less than a centrifugal self-engagement speed;
command the clutch to disengage; and
limit the acceleration of the work vehicle based on the magnitude for the time determined using a hydrostatic unit of a transmission of the work vehicle configured to control a speed of the work vehicle, wherein limiting the acceleration of the work vehicle at the magnitude for the time causes the clutch to rotate at the rotational speed less than the centrifugal self-engagement speed, wherein rotating the clutch at the rotational speed less than the centrifugal self-engagement speed enables the centrifugal head internal relief port to open and the clutch to disengage.

6. The machine-readable-medium of claim 5, wherein determining the engine speed of the work vehicle comprises receiving a signal from a sensor coupled to an engine of the work vehicle, wherein the signal comprises information related to the engine speed.

7. The machine-readable-medium of claim 5, wherein determining the temperature of the hydraulic fluid in the clutch of the work vehicle comprises receiving a signal from a sensor coupled to the clutch, wherein the signal comprises information related to the temperature of the hydraulic fluid.

8. A method for protecting a clutch of a work vehicle from centrifugal head pressure inhibiting clutch disengagement, comprising:

receiving, via a controller, a command to disengage the clutch, wherein the clutch comprises a centrifugal head internal relief port;

determining, via the controller, an engine speed of the work vehicle;

determining, via the controller, a temperature of hydraulic fluid in the clutch;

determining, via the controller, a magnitude for a time to limit acceleration of the work vehicle based on the engine speed and the temperature, wherein limiting the acceleration of the work vehicle at the magnitude for the time causes the clutch to rotate at a rotational speed less than a centrifugal self-engagement speed;

commanding, via the controller, the clutch to disengage; and limiting, via the controller, the acceleration of the work vehicle based on the magnitude for the time determined using a hydrostatic unit of a transmission of the work vehicle configured to control a speed of the work vehicle, wherein limiting the acceleration of the work vehicle at the magnitude for the time causes the clutch to rotate at the rotational speed less than the centrifugal self-engagement speed, wherein rotating the clutch at the rotational speed less than the centrifugal self-engagement speed enables the centrifugal head internal relief port to open and the clutch to disengage.

9. The method of claim 8, wherein determining, via the controller, the engine speed of the work vehicle comprises receiving a signal from a sensor coupled to an engine of the work vehicle, wherein the signal comprises information related to the engine speed.

10. The method of claim 8, wherein determining, via the controller, the temperature of the hydraulic fluid in the clutch comprises receiving a signal from a sensor coupled to the clutch, wherein the signal comprises information related to the temperature of the hydraulic fluid.

\* \* \* \* \*